(12) United States Patent
Tapley et al.

(10) Patent No.: US 12,437,333 B2
(45) Date of Patent: Oct. 7, 2025

(54) AUGMENTED REALITY SYSTEM AND METHOD FOR VISUALIZING AN ITEM

(71) Applicant: eBay Inc., San Jose, CA (US)

(72) Inventors: John Tapley, Santa Clara, CA (US); David Beach, Santa Cruz, CA (US); Bagath Pugazhendhi, Fremont, CA (US)

(73) Assignee: eBay Inc., San Jose, CA (US)

( * ) Notice: Subject to any disclaimer, the term of this patent is extended or adjusted under 35 U.S.C. 154(b) by 410 days.

(21) Appl. No.: 16/952,570

(22) Filed: Nov. 19, 2020

(65) Prior Publication Data

US 2021/0073899 A1    Mar. 11, 2021

Related U.S. Application Data

(63) Continuation of application No. 15/907,155, filed on Feb. 27, 2018, now Pat. No. 10,878,489, which is a
(Continued)

(51) Int. Cl.
| | |
|---|---|
| *G06Q 30/00* | (2023.01) |
| *G06Q 30/0601* | (2023.01) |
| *H04N 21/44* | (2011.01) |
| *H04N 21/45* | (2011.01) |
| *H04N 21/81* | (2011.01) |
| *G06F 3/14* | (2006.01) |

(52) U.S. Cl.
CPC ..... *G06Q 30/0643* (2013.01); *G06Q 30/0601* (2013.01); *G06Q 30/0623* (2013.01); *H04N 21/44016* (2013.01); *H04N 21/4532* (2013.01); *H04N 21/812* (2013.01); *G06F 3/14* (2013.01); *G09G 2340/12* (2013.01); *G09G 2340/145* (2013.01); *G09G 2352/00* (2013.01)

(58) Field of Classification Search
CPC .......... G06Q 30/0643; G06Q 30/0623; G06Q 30/0601; H04N 21/4532; H04N 21/812; H04N 21/44016; G06F 3/14; G09G 2340/12; G09G 2340/145; G09G 2340/00; G09G 2352/00
See application file for complete search history.

(56) References Cited

U.S. PATENT DOCUMENTS

| | | |
|---|---|---|
| 6,901,379 B1 | 5/2005 | Balter et al. |
| 7,149,665 B2 | 12/2006 | Feld et al. |

(Continued)

OTHER PUBLICATIONS

"Interactive Looking Glass Aimed at Young, Tech-Savvy Shoppers," by Mark Chediak and Laura Brost, McClatchy-Tribune Business News (Washington), Jan. 16, 2007. (Year: 2007).*

(Continued)

*Primary Examiner* — Anne M Georgalas
(74) *Attorney, Agent, or Firm* — FIG. 1 Patents

(57) ABSTRACT

In a system and method for searching, browsing, and visualizing items, a first image containing an item is received to be stored in an account associated with a user. The first image is processed using a processor to extract an image of the item from the first image. The image of the item is layered over a stream of video frames received from the client device to form a superimposed image. The superimposed image is caused to be displayed on the client device.

20 Claims, 11 Drawing Sheets

Related U.S. Application Data continuation of application No. 13/194,584, filed on Jul. 29, 2011, now Pat. No. 10,127,606.

(60) Provisional application No. 61/392,673, filed on Oct. 13, 2010.

(56) References Cited

U.S. PATENT DOCUMENTS

| | | | |
|---|---|---|---|
| 7,162,082 B2* | 1/2007 | Edwards | G06T 7/12 |
| | | | 382/293 |
| 7,495,674 B2 | 2/2009 | Biagiotti et al. | |
| 7,683,858 B2 | 3/2010 | Allen et al. | |
| 7,714,912 B2* | 5/2010 | Faisman | H04N 7/181 |
| | | | 434/395 |
| 7,916,129 B2 | 3/2011 | Lin et al. | |
| 7,948,481 B2 | 5/2011 | Vilcovsky | |
| 8,078,498 B2 | 12/2011 | Edwards | |
| 8,121,902 B1* | 2/2012 | Desjardins | G06Q 30/0601 |
| | | | 705/26.1 |
| 8,275,590 B2* | 9/2012 | Szymczyk | G06F 3/0482 |
| | | | 345/646 |
| 8,547,401 B2 | 10/2013 | Mallinson et al. | |
| 9,495,386 B2* | 11/2016 | Tapley | G06F 16/5838 |
| 10,127,606 B2 | 11/2018 | Tapley et al. | |
| 10,878,489 B2 | 12/2020 | Tapley et al. | |
| 2002/0072993 A1 | 6/2002 | Sandus et al. | |
| 2002/0196333 A1 | 12/2002 | Gorischek | |
| 2003/0051255 A1 | 3/2003 | Bulman et al. | |
| 2003/0101105 A1* | 5/2003 | Vock | G06Q 30/0643 |
| | | | 705/27.2 |
| 2003/0110099 A1* | 6/2003 | Trajkovic | G06Q 30/0601 |
| | | | 705/26.1 |
| 2004/0004633 A1* | 1/2004 | Perry | G06Q 30/0603 |
| | | | 715/728 |
| 2004/0075670 A1 | 4/2004 | Bezine et al. | |
| 2005/0131776 A1* | 6/2005 | Perotti | G06F 16/9535 |
| | | | 705/27.2 |
| 2008/0084429 A1 | 4/2008 | Wissinger | |
| 2008/0151092 A1 | 6/2008 | Vilcovsky | |
| 2008/0163344 A1* | 7/2008 | Yang | G06Q 30/0201 |
| | | | 705/7.29 |
| 2008/0225123 A1* | 9/2008 | Osann | A47F 11/04 |
| | | | 348/E11.007 |
| 2009/0115777 A1 | 5/2009 | Reyers Moreno | |
| 2010/0316288 A1 | 12/2010 | Ip et al. | |
| 2012/0192235 A1 | 7/2012 | Tapley et al. | |
| 2018/0189863 A1 | 7/2018 | Tapley et al. | |

OTHER PUBLICATIONS

"You don't have to undress in smart dressing rooms: N.Y. Firm, Cisco Change Clothes-Shopping Experience," by Michele Chandler, McClatchy-Tribune Business News [Washington], Jun. 23, 2007 (Year: 2007).*

"Tech's the Ticket: Electronic Innovations are Providing Entry to the Future of Retailing," by Cate T. Corcoran, WWD, suppl. WWD the Magazine, 194.47: N/A, Penske Business Corporation, Sep. 1, 2007 (Year: 2007).*

Final Office Action received for U.S. Appl. No. 13/194,584, mailed on Jan. 22, 2016, 27 pages.

Final Office Action received for U.S. Appl. No. 13/194,584, mailed on Jul. 27, 2017, 35 pages.

Final Office Action received for U.S. Appl. No. 13/194,584, mailed on Mar. 27, 2014, 22 pages.

Non-Final Office Action received for U.S. Appl. No. 13/194,584, mailed on Jul. 16, 2015, 27 pages.

Non-Final Office Action received for U.S. Appl. No. 13/194,584, mailed on Nov. 29, 2016, 29 pages.

Non-Final Office Action received for U.S. Appl. No. 13/194,584, mailed on Sep. 19, 2013, 25 pages.

Notice of Allowance received for U.S. Appl. No. 13/194,584, mailed on Jun. 8, 2018, 11 pages.

Notice of Allowance received for U.S. Appl. No. 13/194,584, mailed on Jan. 23, 2018, 12 pages.

Final Office Action received for U.S. Appl. No. 15/907,155, mailed on Jun. 23, 2020, 19 pages.

Non Final Office Action Received for U.S. Appl. No. 15/907,155, mailed on Jan. 23, 2020, 30 Pages.

Notice of Allowance received for U.S. Appl. No. 15/907,155, mailed on Sep. 30, 2020, 14 pages.

Araki et al., "Follow-The-Trial-Fitter: Real-Time Dressing without Undressing", 3rd International Conference on Digital Information Management, ICDIM, Dec. 1, 2008, 8 pages.

Corcoran, "Tech's The Ticket: Electronic Innovations Are Providing Entry to the Future of Retailing", WWD the Magazine 194.47: Penske Business Corporation, Sep. 1, 2007, 4 pages.

Cox, "Augmented Reality on Mobile Devices: A New Way of Seeing, and Being? New Tools let Smartphone Users Overlay Digital Data on Live Video", Network World: 12, Network World, Inc., Dec. 16, 2009, 6 pages.

Poulter, "The Magic Mirror: Screen Lets You Try on Outfits . . . Without Taking Your Clothes Off", Daily Mail, Jun. 16, 2010, 38 Pages.

* cited by examiner ary System and Method for Visualizing an Item" which claims priority to Ser. No. 13/194,584, filed Jul. 29, 2011, which claims priority under 35 U.S.C. § 119 to U.S. Provisional Patent Application No. 61/392,673, filed Oct. 13, 2010, and entitled "METHOD TO ASSEMBLE A COLLAGE INCLUDING AN ITEM IMAGE RETRIEVED FROM AN ITEM LISTING," the three applications are incorporated by reference herein in their entirety.

AUGMENTED REALITY SYSTEM AND METHOD FOR VISUALIZING AN ITEM

CROSS-REFERENCE TO RELATED APPLICATIONS

This application claims priority as a continuation of U.S. patent application Ser. No. 15/907,155, filed Feb. 27, 2018, entitled "Augmented Reality System and Method for Visualizing an Item" which claims priority to Ser. No. 13/194,584, filed Jul. 29, 2011, which claims priority under 35 U.S.C. § 119 to U.S. Provisional Patent Application No. 61/392,673, filed Oct. 13, 2010, and entitled "METHOD TO ASSEMBLE A COLLAGE INCLUDING AN ITEM IMAGE RETRIEVED FROM AN ITEM LISTING," the three applications are incorporated by reference herein in their entirety.

BACKGROUND

Mobile devices offer users the ability to access the Internet through an Internet browser application or standalone applications. Internet websites and applications accessed by mobile device may be limited in functionality, display quality, or access speed, among other things. These limitations may be the result of a mobile device having a smaller screen, a slower network connection, or limited processing power. In the electronic commerce arena, websites and applications offering users access to electronic commerce platforms may similarly be limited. Websites and applications designed for mobile access may not offer a rich, interactive experience a user expects when shopping or browsing for items. As a result, a user may be discouraged from using the mobile device to conduct electronic commerce transactions.

BRIEF DESCRIPTION OF DRAWINGS

Various ones of the appended drawings merely illustrate example embodiments of the present invention and cannot be considered as limiting its scope.

DETAILED DESCRIPTION

Figure 1:
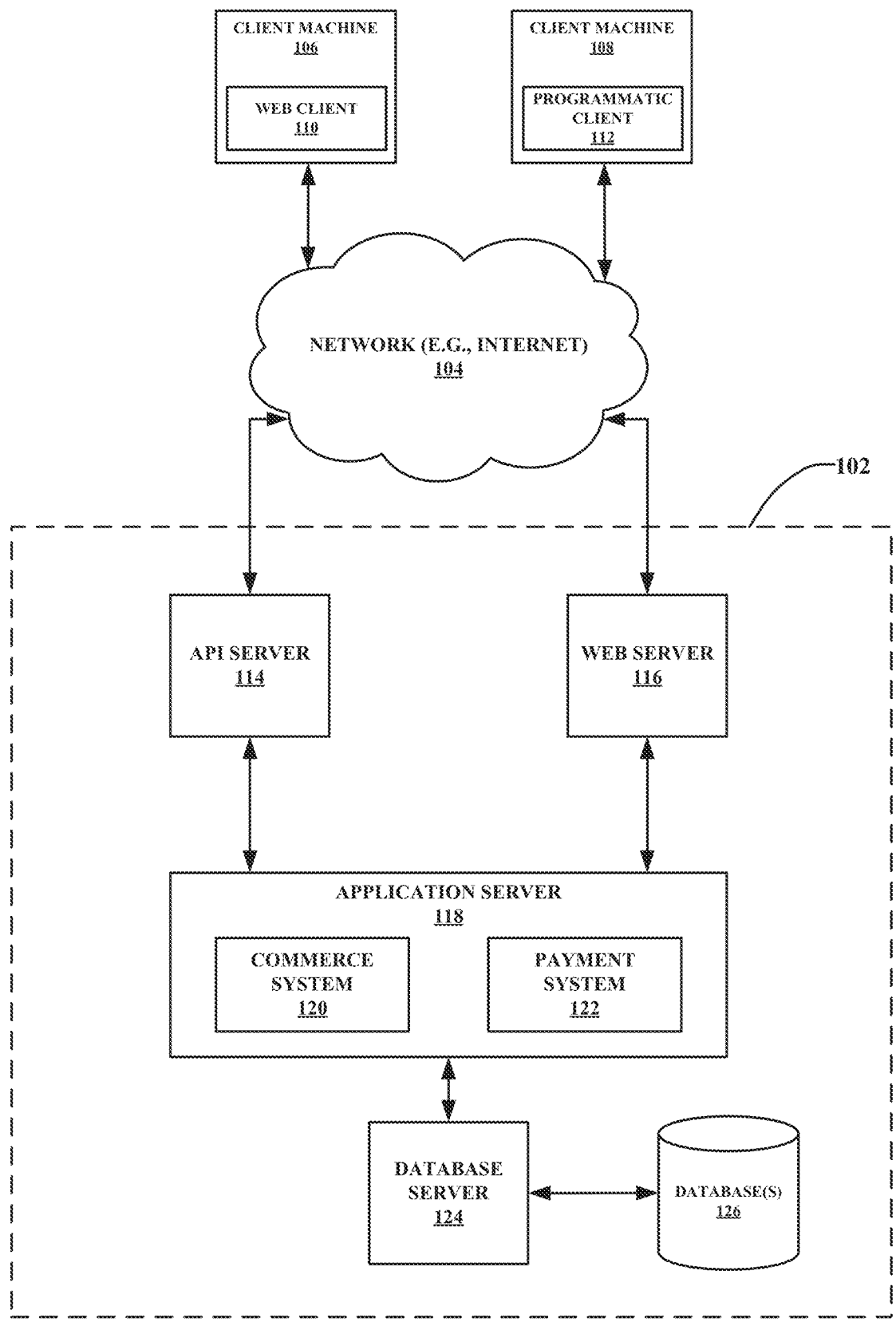
FIG. 1 is a block diagram illustrating an example embodiment of a network architecture of a system used to search for and navigate among items depicted in images.

In the following description, for purposes of explanation, numerous specific details are set forth in order to provide a thorough understanding of some example embodiments. It may be evident, however, to one skilled in the art that the embodiments of the disclosure may be practiced without these specific details.

The description that follows includes systems, methods, techniques, instruction sequences, and computing machine program products that embody illustrative embodiments of the present invention. In the following description, for purposes of explanation, numerous specific details are set forth in order to provide an understanding of various embodiments of the disclosed subject matter. It will be evident, however, to those skilled in the art that embodiments of the disclosed subject matter may be practiced without these specific details. In general, well-known instruction instances, protocols, structures, and techniques have not been shown in detail.

As used herein, the terms "and" and "or" may be construed in either an inclusive or exclusive sense. Additionally, although various example embodiments discussed below focus on a network-based commerce environment, the embodiments are given merely for clarity in disclosure. Thus, any type of electronic publication, electronic commerce, or electronic business system and method, including various system architectures, may employ various embodiments of the commerce system and method described herein and be considered as being within a scope of example embodiments. Each of a variety of example embodiments is discussed in detail below.

Example embodiments described herein provide systems and methods to search for and browse among presently available items. Further example embodiments described herein provide systems and methods for showcasing and visualizing items in a user-interactive manner. Items may be searched for, browsed, and visualized using a client application configured to integrate imaging functionality of a client device, such as a mobile or handheld device, with a commerce platform. The application may permit a user to search for and retrieve items of interest for display on the client device. The application permits a user to purchase or bid on displayed items.

In further embodiments, the client application may operate in conjunction with imaging technology found on mobile or handheld devices by allowing a user to capture an image of an item of interest and search a database of items for an item matching or resembling the captured image. Images of items of interest may be saved by the user for future reference. In one example embodiment, a user may visualize the item on the user by superimposing the saved image of the item over an image of the user captured by the client device. Visualizing the item in this manner offers the user a unique and innovative way to shop for items. In one example embodiment, the user may further visualize the item by layering a saved image of an item over a live video stream of the user. This "augmented reality" feature may use the imaging functionality of the client device to provide a unique shopping perspective.

With reference to FIG. 1, an example embodiment of a high-level client-server-based network architecture 100 to provide content based on an image is shown. A networked system 102, in an example form of a network-server-side functionality, is coupled via a communication network 104 (e.g., the Internet, wireless network, cellular network, or a Wide Area Network (WAN)) to one or more client machines 106 and 108. FIG. 1 illustrates, for example, a web client 110 operating via a browser (e.g., Internet Explorer® browser developed by Microsoft® Corporation), and a programmatic client 112 executing on respective client devices 106 and 108.

The client machines 106 and 108 may comprise a mobile phone, smart phone, desktop computer, laptop, handheld device, or any other communication device that a user may use to access the networked system 102. In some embodiments, the client machines 106, 108 may comprise or be connectable to an image capture device (e.g., camera). The client machines 106, 108 also may comprise a voice recognition module (not shown) to receive audio input and a display module (not shown) to display information (e.g., in the form of user interfaces). In further embodiments, the client machines 106, 108 may comprise one or more of a touch screen, accelerometer, and Global Positioning System (GPS) device.

An Application Programming Interface (API) server 114 and a web server 116 are coupled to, and provide programmatic and web interfaces respectively to, one or more application servers 118. The application servers 118 host a commerce system 120 and a payment system 122, each of which may comprise one or more modules, applications, or engines, and each of which may be embodied as hardware, software, firmware, or any combination thereof. The application servers 118 are, in turn, coupled to one or more database servers 124 facilitating access to one or more information storage repositories or database(s) 126. In one embodiment, the databases 126 may comprise an item database storing data corresponding to available items for purchase or bidding. The databases 126 may further comprise a knowledge database that may be updated with content, user preferences, and user interactions (e.g., saved items, feedback, surveys, etc.).

The commerce system 120 facilitates transactions between users and electronic commerce providers. As such, the commerce system 120 provides a number of commerce and marketplace functions and services to users that access the networked system 102. The commerce system 120 is discussed in more detail in connection with FIG. 2. While the commerce system 120 is discussed in terms of a marketplace environment, it is noted that the commerce system 120 may be associated with a non-marketplace environment.

The payment system 122 provides a number of payment services and functions to users. The payment system 122 allows users to accumulate value (e.g., in a commercial currency, such as the U.S. dollar, or a proprietary currency, such as "points") in accounts, and then later to redeem the accumulated value for products (e.g., goods and services) that are made available via the commerce system 120. The payment system 122 also facilitates payments from a payment mechanism (e.g., a bank account, PAYPAL®, or credit card) for purchases of items via the network-based marketplace. While the commerce system 120 and the payment system 122 are shown in FIG. 1 to both form part of the networked system 102, it will be appreciated that, in alternative embodiments, the payment system 122 may form part of a payment service that is separate and distinct from the networked system 102.

While the example network architecture 100 of FIG. 1 employs a client-server architecture, a skilled artisan will recognize that the present disclosure is not limited to such an architecture. The example network architecture 100 can equally well find application in, for example, a distributed or peer-to-peer architecture system. The commerce system 120 and payment system 122 also may be implemented as standalone systems or standalone software programs operating under separate hardware platforms, which do not necessarily have networking capabilities.

Figure 2:
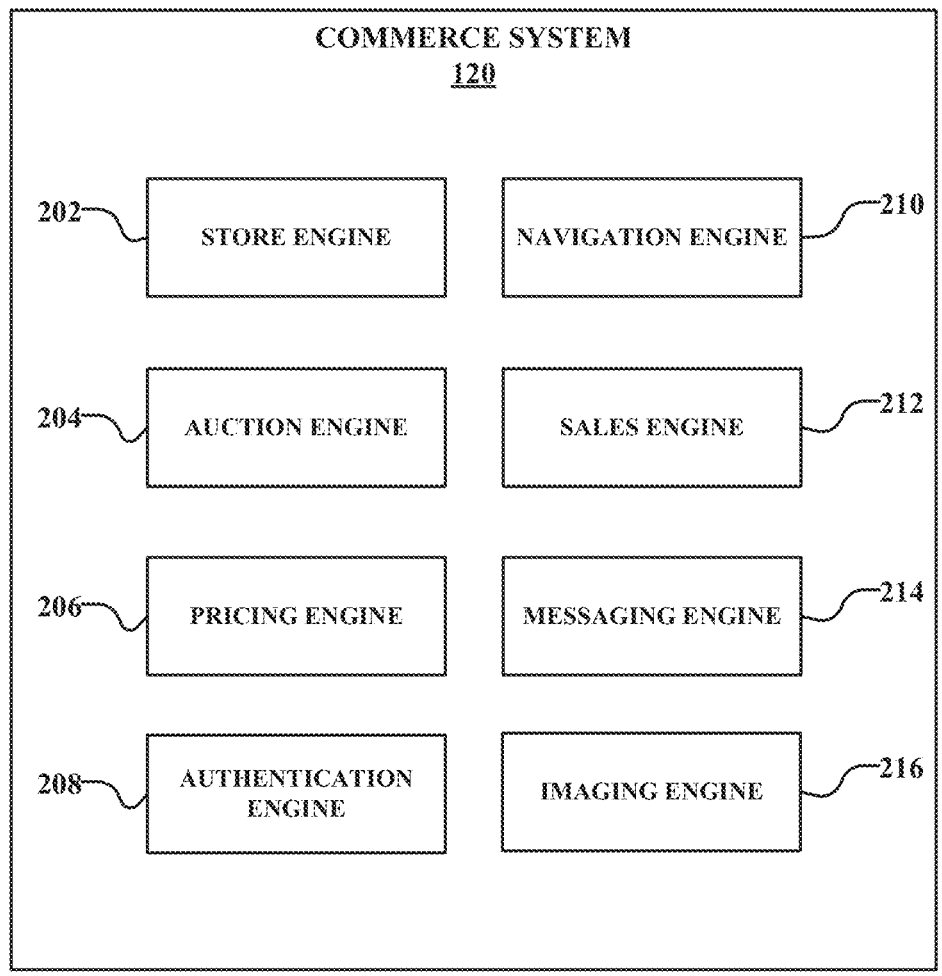
FIG. 2 is a block diagram illustrating an example embodiment of a commerce system.

Referring now to FIG. 2, an example block diagram illustrating multiple components that, in one example embodiment, are provided within the commerce system 120 of the networked system 102 (see FIG. 1) is shown. The commerce system 120 may be hosted on dedicated or shared server machines (not shown) that are communicatively coupled to enable communications between the server machines. The multiple components themselves are communicatively coupled (e.g., via appropriate interfaces), either directly or indirectly, to each other and to various data sources, to allow information to be passed between the components or to allow the components to share and access common data. Furthermore, the components may access the one or more database(s) 126 via the one or more database servers 124, both shown in FIG. 1.

In one example embodiment, the commerce system 120 provides a number of navigating, listing, and imaging mechanisms whereby a user can search for and navigate among listings of items for sale, can visualize the items from different perspectives, and can express interest in or indicate a desire to purchase such items. To this end, the commerce system 120 may comprise at least one store engine 202 and at least one auction engine 204. The store engine 202 allows sellers to group listings within a "virtual" store, which may be branded and otherwise personalized by and for the seller. Such a virtual store also may offer promotions, incentives, and features that are specific and personalized to the seller. In one example, the seller may offer a plurality of items for immediate sale, using, for example, a Buy-It-Now option in the virtual store, offer a plurality of items for auction, or a combination of both.

The one or more auction engines 204 may support auction-form listing and price setting mechanisms (e.g., English, Dutch, Chinese, Double, Reverse auctions). The various auction engines 204 also provide a number of features in support of these auction-format listings, such as a reserve price feature whereby a seller may specify a reserve price in connection with a listing and a proxy-bidding feature whereby a bidder may invoke automated proxy bidding.

A pricing engine 206 supports various price listing formats. One such format is a fixed-price listing format (e.g., the traditional classified advertisement-type listing, a catalog listing). Another format comprises a buyout-type listing. Buyout-type listings (e.g., the Buy-It-Now (BIN) technology developed by eBay, Inc.) may be offered in conjunction with auction-format listings and allow a buyer to purchase goods or services, which are also being offered for sale via an auction, for a fixed price that is typically higher than a starting price of an auction for an item.

An authentication engine 208 receives user credentials, in the form of a username and password, for example, submitted by the client application. The user credentials may be submitted in response to the user accessing an account associated with the user. Example embodiments may require the user to be authenticated before purchasing items or using the various item browsing and visualization functionalities offered by the client application. The authentication engine 208 may verify the user's credentials and authorize the user to access the user's account.

A navigation engine 210 facilitates navigation of the commerce system. For example, a search module (not shown) of the navigation engine 210 offers a gateway to a browsing experience for a user. The search module enables keyword searches of items stored in a database 126. The search module further enables searching of items matching or resembling an image submitted by the client application. In response to a search request, the search module may return search results in a variety of views. The search module further is configured to narrow the search results by category or sub-category.

A first search result view for presenting search results within the client application to a user may be a list view. The list view is a standard list with an image of an item, a title, a price, and, if applicable, auction information for a listing involving the item. In an example embodiment, because the visual appearance of item generally is of greater interest to a user, the image of the item may be prominently displayed with the display area of the client device. To enhance the user browsing experience, the client application may leverage touch screen functionality commonly found on mobile devices. The list view may be scrolled using a vertical swipe or other touch screen gesture for navigating up and down a list. Items may be selected by a single tap, double tap, or other touch screen gesture specified by the client device for selecting an item.

A second search result view for presenting search results within the client application to a user may be a grid view. The grid view displays product images in a grid, with each image representing an item returned as a search result. The number of items in the grid may depend on the size of the display of the client device. In one example embodiment, items may be displayed in a four-by-four grid. The grid view also may leverage client machine touch screen functionality to aid in browsing among displayed item results. For example, users may use the touch screen to browse grid to grid by swiping the screen left to right or right to left. Such transition from grid to grid is intended to be smooth.

A third search result view may be an image flow view which provides the user with a way to view product images using the full display screen of the client device. Users may use the touch screen of the client machine to browse from item to item by swiping the screen from left to right or right to left. An overlay at the bottom of the image may provide the item title and pricing information.

Additional user interface functionality may be provided for any of the views in the form of a navigation bar. In one embodiment, the navigation bar may be located at the top of the client device display screen. The navigation bar may provide a way to toggle between views. A button or other user-selectable icon may be located in the user interface to display a search bar that permits a user to refine a search or to search using different keywords or images.

The search module of the navigation engine 210 further may permit a user to search for items by color. The color to be searched may be selected from a color picker, such as a palette or color wheel. In one embodiment, the color picker may be located in an advanced search screen.

The search module may receive saved searches and may track a history of search terms used by a user. The saved searches and search term history further may be stored by the client application executing on the client device. In one example embodiment, the client application may save the last ten keyword search terms input by the user. In another example embodiment, the client application may communicate the saved keyword search terms and saved searches to the commerce system 120.

The navigation engine 210 also may offer browsing functionality. Users may have the option of browsing among items, categories of items, or sub-categories of items without first conducting a search. Browsing may be conducted hierarchically, with a user being presented with a set of general categories among which to browse for items. Upon selection of a particular category of interest, the user either may browse among the items contained in the category or further narrow the browsing by selecting a sub-category of the category.

A sales engine 212 may transmit flash sales alerts to the client application to alert a user of current and upcoming sales. A selectable listing of current and upcoming sales may be presented in a main display page of the client application. Upon selection of a current sale, the application may direct the user to a sales web page. Upon selection of an upcoming sale, the application may display information about the sale to the user, including the start date, the percentage off the regular price, and any featured items. The application may permit the user to sign up for updates for the selected sale. If the user signs up for the updates, this data may be transmitted to the commerce system 120.

The sales engine 212 may operate in conjunction with the navigation engine 210 to permit a user to browse between active sales using the client application. A user browsing a sale page may have the option to return to the main page. Each sale page may be displayed to a user in either a grid view or a list view, with the user having the option of toggling between views. Each sale page may display the items listed for sale. When a user selects an item, the application may direct the user to a page for the selected item. The item page may include information about the item, including an image of the item, a title, a price, a strike-through price (i.e., the pre-sale price), an item condition, shipping information, payment information, an item description, and an option to immediately purchase the item, such as a "Buy It Now" user-selectable button. A link may be provided to allow the user to navigate back to the sale page from the item page.

Items of interest encountered during browsing or searching may be saved. In one embodiment, the items may be saved in the client machine to be accessed by the client application. In another embodiment, the saved items may be transmitted to the commerce system 120 to be associated with a user or user account. The client application further may permit a user to share saved items or items of interest with other users via email, a social networking platform or by bumping or otherwise directly transmitting between client devices.

A messaging engine 214 may generate and deliver messages and alerts to users of the networked system 102. Included among the messages and alerts may be flash sales alerts and any updates that a user has registered for. The messaging engine 214 may use any one of a number of message delivery networks and platforms to deliver messages to users. For example, the messaging engine 214 may deliver electronic mail (e-mail), an instant message (IM), a Short Message Service (SMS), text, facsimile, or voice (e.g., Voice over IP (VoIP)) messages via wired networks (e.g., the Internet), a Plain Old Telephone Service (POTS) network, or wireless networks (e.g., mobile, cellular, WiFi, WiMAX).

An imaging engine 216 may provide image processing functionality to the client application. In one embodiment, the imaging engine 210 may receive and process user-submitted images of items as part of a search for stored items. The imaging engine 216 further may provide functionality to the client application for various item visualization options. The imaging engine 210 will be discussed in more detail in connection with FIG. 3.

Although the various components of the commerce system 120 have been defined in terms of a variety of individual modules and engines, a skilled artisan will recognize that many of the items can be combined or organized in other ways. Furthermore, not all components of the commerce system 120 have been included in FIG. 2. In general, components, protocols, structures, and techniques not directly related to functions of example embodiments (e.g., dispute resolution engine, reputation engine, loyalty promotion engine, personalization engines) have not been shown or discussed in detail. The description given herein simply provides a variety of example embodiments to aid the reader in an understanding of the systems and methods used herein.

Figure 3:
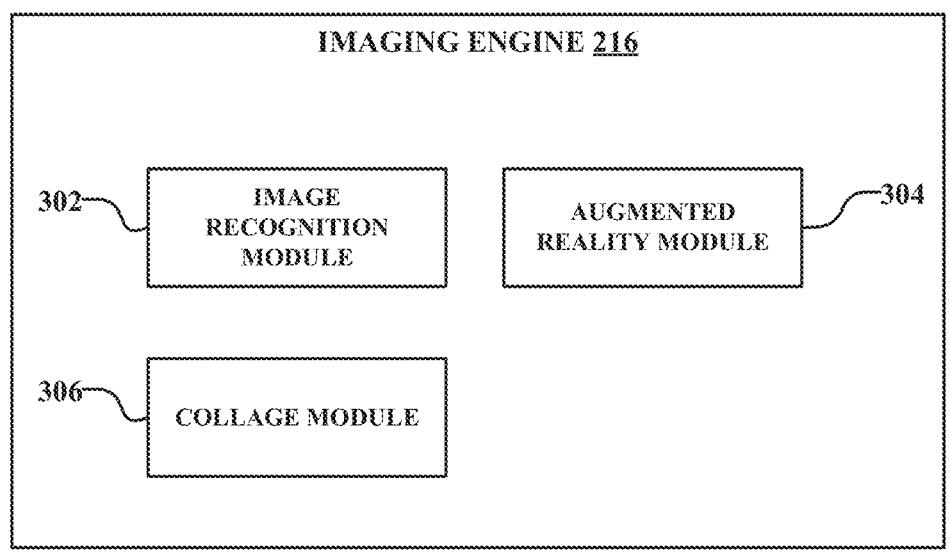
FIG. 3 is a block diagram illustrating an example embodiment of an imaging engine.

Referring now to FIG. 3, an example diagram of the imaging engine 216 is shown. The imaging engine 216, in conjunction with the navigation engine 210, provides mechanisms for image processing and visualization as part of a user shopping experience. The imaging engine 216 may include an image recognition module 302, an augmented reality module 304, and a collage module 306. Alternative embodiments may comprise further components or modules not directly related to example embodiments of image processing and visualization, and thus are not shown or discussed. Furthermore, some of the components of the imaging engine 216 may be located elsewhere (e.g., in the navigation engine 210) or be located at the client machines 106, 108.

In example embodiments, a user (e.g., a buyer) may search or browse for items available for purchase. One method of searching for items that is supported by the client application may be a visual search using an image captured by the client device. In further example embodiments, a user may desire to visualize how an item, such as clothing, shoes, or an accessory, may appear on the user.

In the first example described above, an image submitted as part of a visual search may be processed by the image recognition module 302. The image may be used to search a database 124 of stored items to retrieve items that match or resemble the submitted image. The image recognition module may apply known content-based image retrieval techniques and algorithms, including pattern matching and image distance measures, to identify items matching the submitted image.

In the second example described above, an augmented reality module 304 may provide mechanisms by which a user may visualize an item. In an example embodiment, the augmented reality module 304 may be located within client machines 106, 108. A first mechanism may be the provision of a technique called "Paper Doll" in which a user leverages the camera functionality of a client device to take a photograph of the user. The photograph of the user may be saved in the client device and accessed by the client application to serve as a canvas for a page. Saved items of interest that have been downloaded from the commerce system 120 may be layered over the user photograph, thereby helping a user visualize how the item would look on the user. To make the visualization as realistic as possible, the imaging engine 216 may automatically remove or make transparent the background to a saved item image prior to superimposing the item image over the user photograph. The imaging engine (or one of its components) may automatically perform edge detection around an image and remove image content around the edge.

A second mechanism by which to visualize an item may be an "augmented reality" view in which a user may point a camera at a mirror or other reflective surface, thereby capturing a live camera feed of a reflection of the user. The client application may access this live camera feed as a canvas and overlay saved item images over the live camera feed. The imaging engine 216 (or one of its components) may perform edge detection of the saved item image and automatic removal or hiding of the background of the saved item image, as described above, prior to superimposing the item image over the live camera feed.

The imaging engine 216 further includes a collage module 306 that allows a user to create a collage from the saved item list. In an example embodiment, the collage module 304 may be located within client machines 106, 108. The collage module 306 may permit a user to select item for inclusion on a collage canvas. The collage feature may leverage touch screen functionality of the client machines 106, 108 to permit a user to use touch screen gestures to manipulate the selected item. For example, the user may use touch screen gestures to move an item around the collage canvas, shrink the size of the item image, for example, by employing a pinching motion, and enlarge the size of the item image. Multiple items may be selected and included on the collage canvas. For example, a user may assemble multiple items in a collage to mimic a clothing outfit, or may match a pair of shoes with an outfit to determine how the shoes appear relative to the outfit. An image may be generated from the collage which may be transmitted or stored in an image library of the client device. In one embodiment, the collage image may be transmitted to the commerce system 120 for association with a user account. The collage image may be shared with other users via email, a social networking tool, or by a direct connection with other devices.

Ideally, the canvas should occupy as much display screen real estate as possible. One or more user interface elements may overlay the canvas to display information about the saved items. These user interface elements may be toggled to appear or disappear by selecting a user-selectable element. Each item displayed on the collage canvas is selectable, such that a request to the networked system 102 to deliver an item page is sent when user performs a touch screen gesture to select the collage item.

In the event an item is no longer available on the networked system 102 because the item has sold and the image of the item is no longer available, or in the event that an image has been pulled due to certain reasons, legal (e.g., copyright) or otherwise, the item and the image may be automatically removed from the client machines 106, 108 and any saved images (e.g., superimposed images, collage images). A message may be delivered or displayed to notify a user that the product is no longer available.

Figure 4:
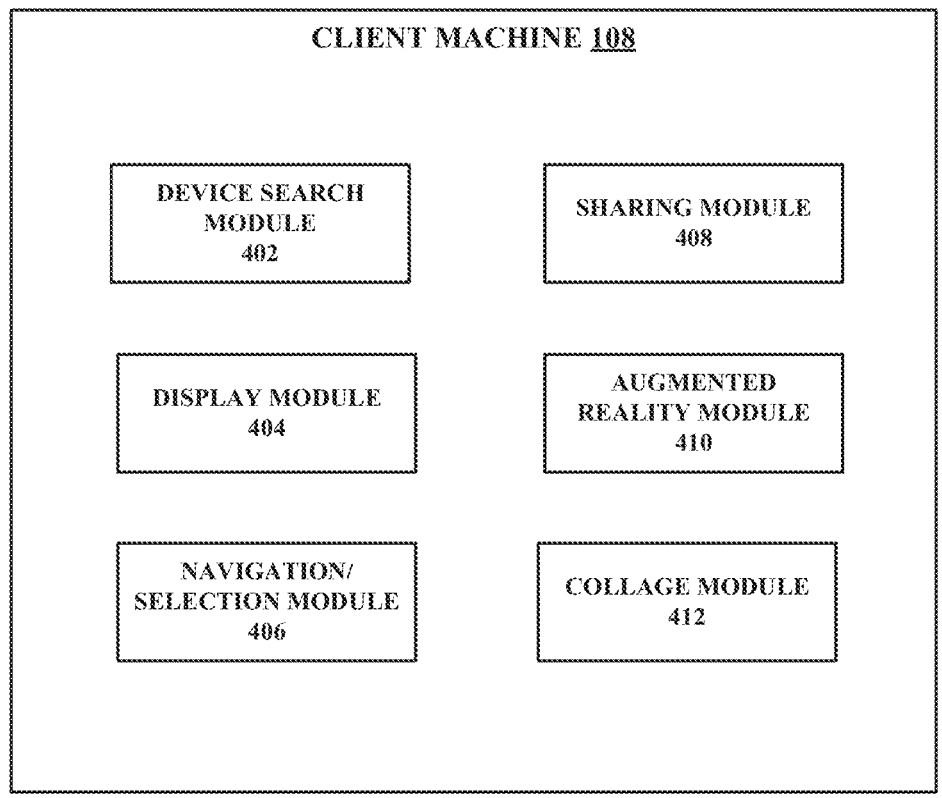
FIG. 4 is a block diagram illustrating an example embodiment of a client device configured to operate in the system of FIG. 1.

FIG. 4 is a block diagram illustrating an example embodiment of an enhanced shopping system 400 located at the client machines 106, 108. The enhanced shopping system 400 may be embodied on a machine-readable storage medium on the client machines 106, 108. When activated, the enhanced shopping system 400 allows the client machines 106, 108 to perform functions related to searching, browsing, and visualizing items maintained on the networked system 102. In example embodiments, the enhanced shopping system 400 comprises a device search module 402, a display module 404, a navigation/selection module 406, and a sharing module 408.

The device search module 402 provides a mechanism to perform a search on client machines 106, 108. For example, the device search module 402 may provide a field in which terms for a keyword or free-text search may be entered. In other embodiments, searches may be performed based on an imported image. Additionally, the device search module 402 may allow the user to browse for information.

The display module 404 may generate and display user interfaces corresponding to a searching process, a browsing process, and a visualization process, among other things. Other user interfaces capable of being generated and displayed by the display module 404 may include a user interface corresponding to a purchasing process. The user interfaces may include listings of items currently available, saved for future reference, previously returned in searches, or previously browsed. The user interfaces further may display items alone or in combination with user-submitted or user-generated images.

The navigation/selection module 406 permits the user to search for and browse among items available for purchase or bidding. The navigation/selection module 406 may provide options for the user to browse items by category, to narrow a category to sub-categories, and to browse among items returned as results of a search. The navigation/selection module 406 further may permit a user to browse among images stored in an image library of the client device for importation or use by the client application. The imported images may be selected and used as part of a visualization option offered by the client application. The navigation/selection module 406 further enables a user to select an item for sharing, saving, or purchase, among other things, through the use of input devices or touch screen gestures.

The sharing module 408 facilitates sharing of saved items of interest with other users. Upon receiving an indication that user desires to share an item, the sharing module 408 may open an electronic mail application to allow the user to share the item via email. Alternatively, the sharing module 408 may interface with a social networking site or tool to permit a user to share an item with a social network contact. The sharing module 408 further may interface with other applications executing on the client device to permit the client device to share the item with other client devices, by for example, "bumping" client devices.

The augmented reality module 410 may be substantially similar to the augmented reality module 304 described herein with reference to imaging engine 216. The collage module 412 may be substantially similar to the collage module 306 described herein with reference to the imaging engine 216.

Figure 5:
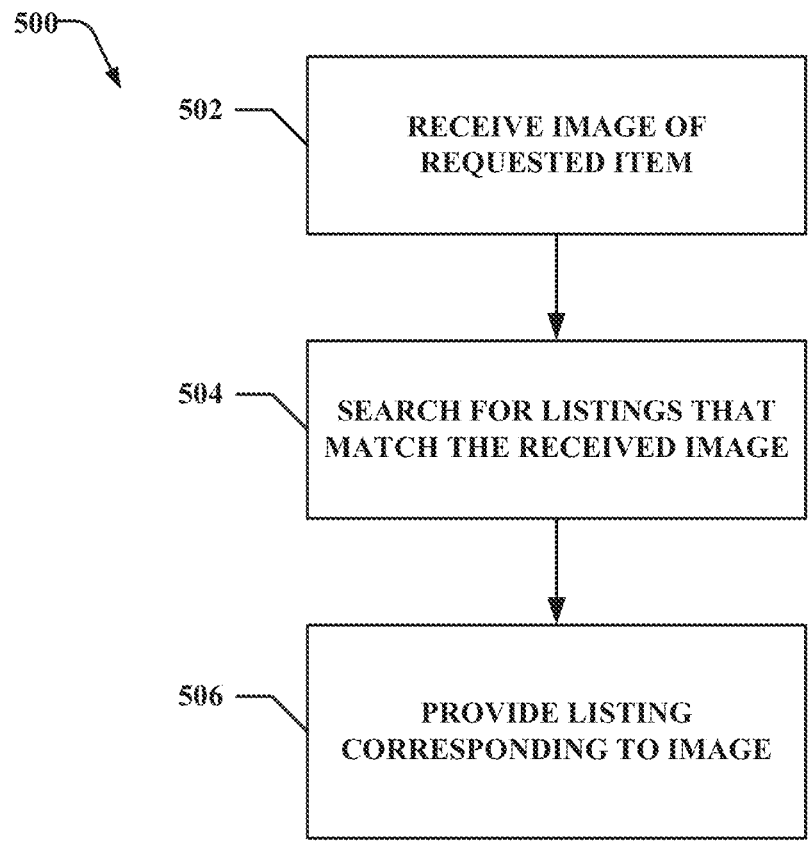
FIG. 5 is a flow diagram of an example method for searching for item listings of interest.

FIG. 5 is a flow diagram of an example method 500 for searching for items of interest. At operation 502, a request for an item, including a user-submitted image, is received from client machines 106, 108. The request may include terms or images to be used for a search, one or more browsing or navigation instructions, or any other information that provides the navigation engine 210 with an indication of items or content that the user desires to view.

At operation 504, the imaging engine 216 may use the user-submitted image to generate a search of items stored in the database 126. The imaging engine 216 may apply known content-based image retrieval techniques and algorithms, including pattern matching and image distance measures, to identify items matching the submitted image. In addition to items matching the submitted image, the imaging engine 216 may return items that resemble the submitted image.

At operation 506, the commerce system 120 may return a list of items or item listings that match or resemble the submitted image to the requesting client device. The list of items or item listings may be selectable by the user to access further details about the items.

Figure 6:
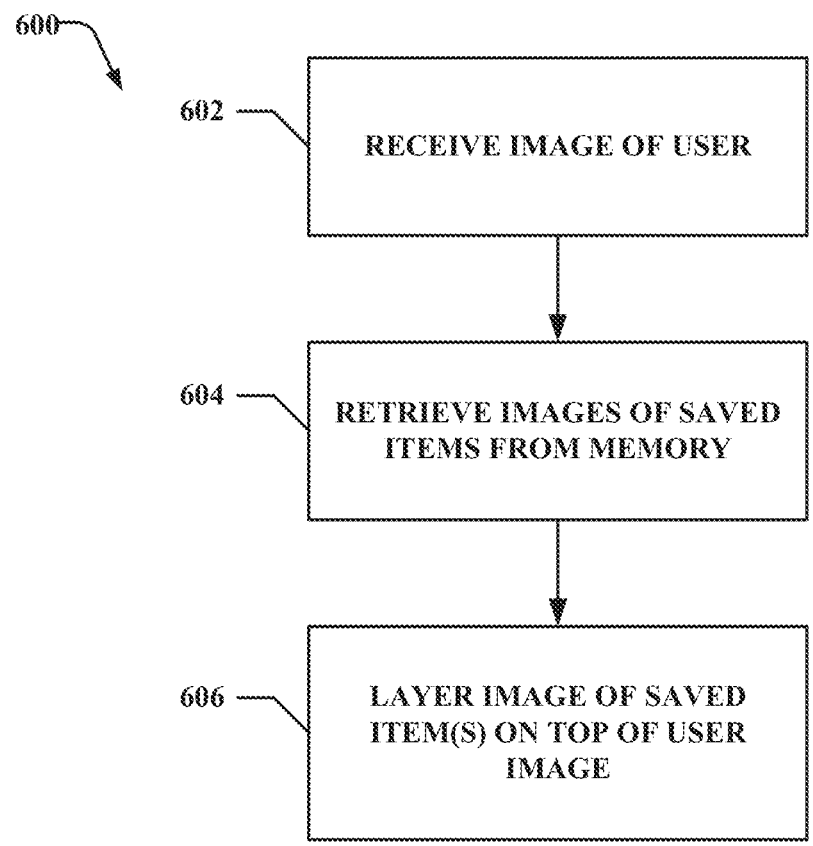
FIG. 6 is a flow diagram of an example method for displaying an item in a user-interactive manner.

FIG. 6 is a flow diagram of an example method 600 for displaying an item in a user-interactive manner. At operation 602, an image of a user may be received. The image may be user-generated and may be stored in an image library of the client device. In one embodiment, the client application may receive or retrieve the user-submitted image. In another example embodiment, the user-submitted image may be received by the commerce system 120 as well. At operation 604, an image of an item may be received from the commerce system 120 and may be saved in the client device for future reference. In one embodiment, the item image may be received and saved at a time prior to the user-interactive item display. Alternatively, the item image may be transmitted from the commerce system 120 to the client device during the user-interactive item display process.

At operation 606, the item image may be processed for use in the user-interactive item display process. Processing the item image may include performing edge detection of the item image to identify the item in the image compared to the background of the image. Upon identifying the edges of the item, the background of the item may be removed or made transparent. The processing of the item image may be performed by the client application. Alternatively, the saved item image may be processed by the commerce system 120.

At operation 608, the processed item image may be superimposed over the user-generated image. In one embodiment, the superimposition of images may be provided to the client device for use. Alternatively, the client application and device may generate the superimposed image. The effect of this superimposition is to help the user visualize how the item would appear with respect to the user-generated image. For example, if the user-generated image is an image of the user, the effect of the superimposition would be to aid the user in visualizing how the item would appear on the user. Alternatively, the user-generated image could be a mannequin, a background image, or an object the user desires to use as a background for the item image.

Figure 7:
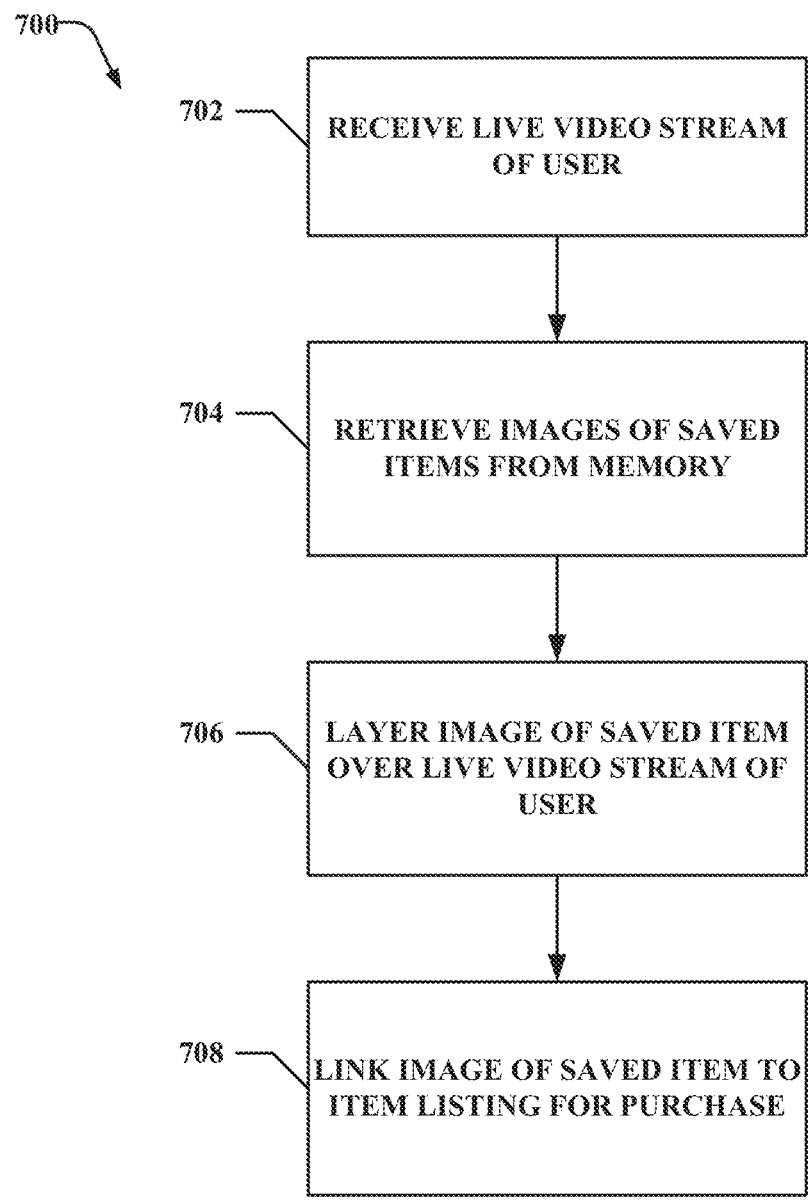
FIG. 7 is a flow diagram of an example method for an "augmented reality" option for displaying items.

FIG. 7 is a flow diagram of an example method for an "augmented reality" option for displaying items. At operation 702, the client application is provided access to a live camera feed from a camera component of the client machines 106, 108. The live camera feed need not be a recorded video stream. Rather, the live camera feed may be a recorded video stream or may simply be a feed of the camera component generated when the camera component is activated and enabled.

At operation 704, a user may retrieve images of saved items of interest from memory. In one embodiment, the images may be retrieved from an image library maintained on the client machines 106, 108. Alternatively, the images may be retrieved from the commerce system 120, where they may be stored in association with the user or an account of the user.

At operation 706, the retrieved image may be processed. Processing of the image may include performing edge detection on the image to distinguish the item in the image from its surroundings. Processing the image may further include either removing the background of the image or making the background transparent.

At operation 708, the client application may layer the processed image over the live camera feed. In this respect, the user is able to visualize in real-time how an item relates to the subject of the live camera feed. The user will not have to rely on stored images to visualize how an item appears on top of a background image.

Figure 8:
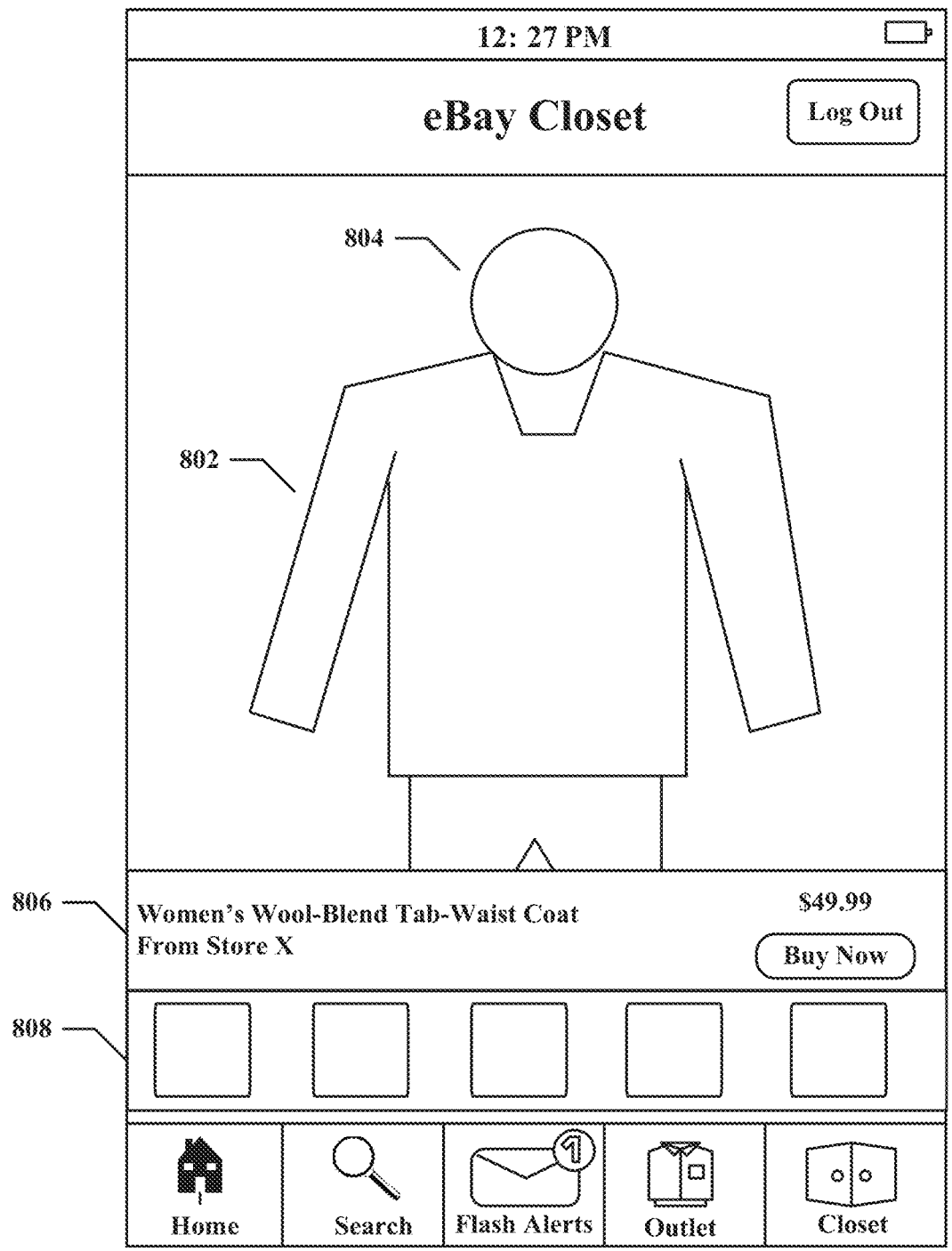
FIG. 8 is an example user interface illustrating a user-interactive item display.

FIG. 8 is an example user interface illustrating a user-interactive item display. The example is provided based on a search performed for a women's coat. The women's coat 802 shown in FIG. 8 may be a saved item which the user is potentially interested in purchasing or bidding on. The client application provides an enhanced shopping option whereby the user can visualize the saved item superimposed over an image. In this case, the user may navigate to an "EBAY® Closet" associated with the user, where images of saved items are stored. The user can select an image of a saved item and a background image. In the example embodiment of FIG. 8, the user may select an image of the user 804 to serve as the background. The image of the saved item may be superimposed over the background image to give the user the appearance of wearing the saved item.

Additional elements of the user interface may include a description 806 of the saved item being displayed, in this case, a women's wool-blend tab-waist coat. A price of the saved item also may be displayed in a horizontal display element 806, such as a toolbar. The saved item may be purchased by selecting the "Buy Now" button. By clicking on the horizontal display element 806, the user may be taken to a different page to view additional information about the saved item. Additionally, a second horizontal display element 808 may be displayed in the user interface. This horizontal display element 808 may include additional items, each being a selectable image of the item that may re-direct the user to a page containing more detailed information about the selected item. The items displayed in element 808 may be other saved items associated with the user's EBAY® Closet, or may be items related to the current saved item being displayed.

Figure 9:
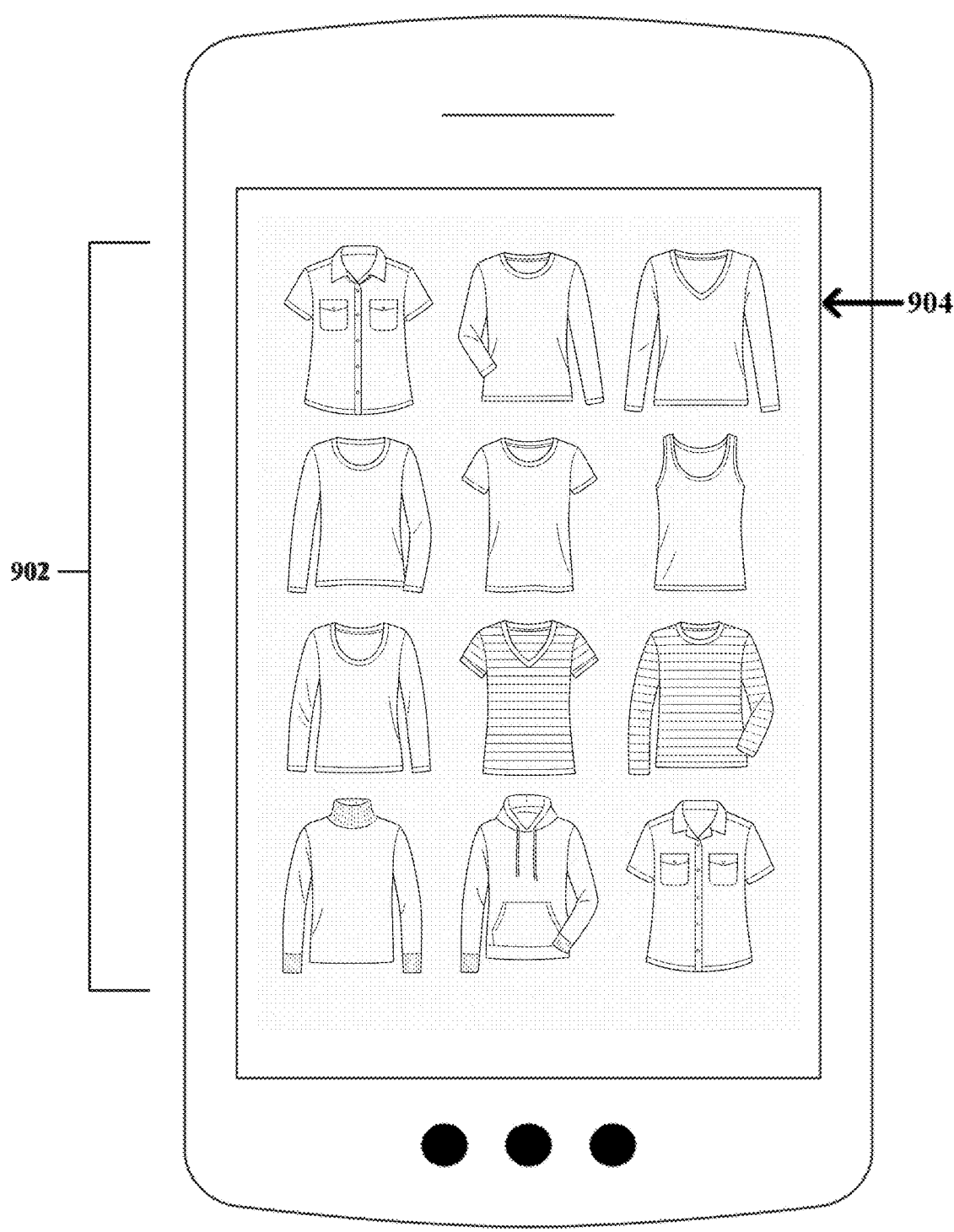
FIG. 9 is an example user interface illustrating item listings.

FIG. 9 is an example user interface illustrating item listings. Referring to FIG. 9, an interface for viewing items is illustrated. These items may be the results generated from a search, items that have been saved by a user, or items that a user is browsing. The particular example view demonstrated in FIG. 9 may be a grid view for displaying items 902, in which items are displayed as images. The user may select any item displayed in the grid view by using a touch screen gesture, such as tapping on an item image, or by using an input device to select the item, such as tapping on an item image with a stylus or pointing device. The user may navigate to view additional images similarly by using a touch screen gesture, such as a horizontal swipe of a finger on the screen of the client device, or by using an input device to select a right, left, next, or previous arrow 904.

Figure 10:
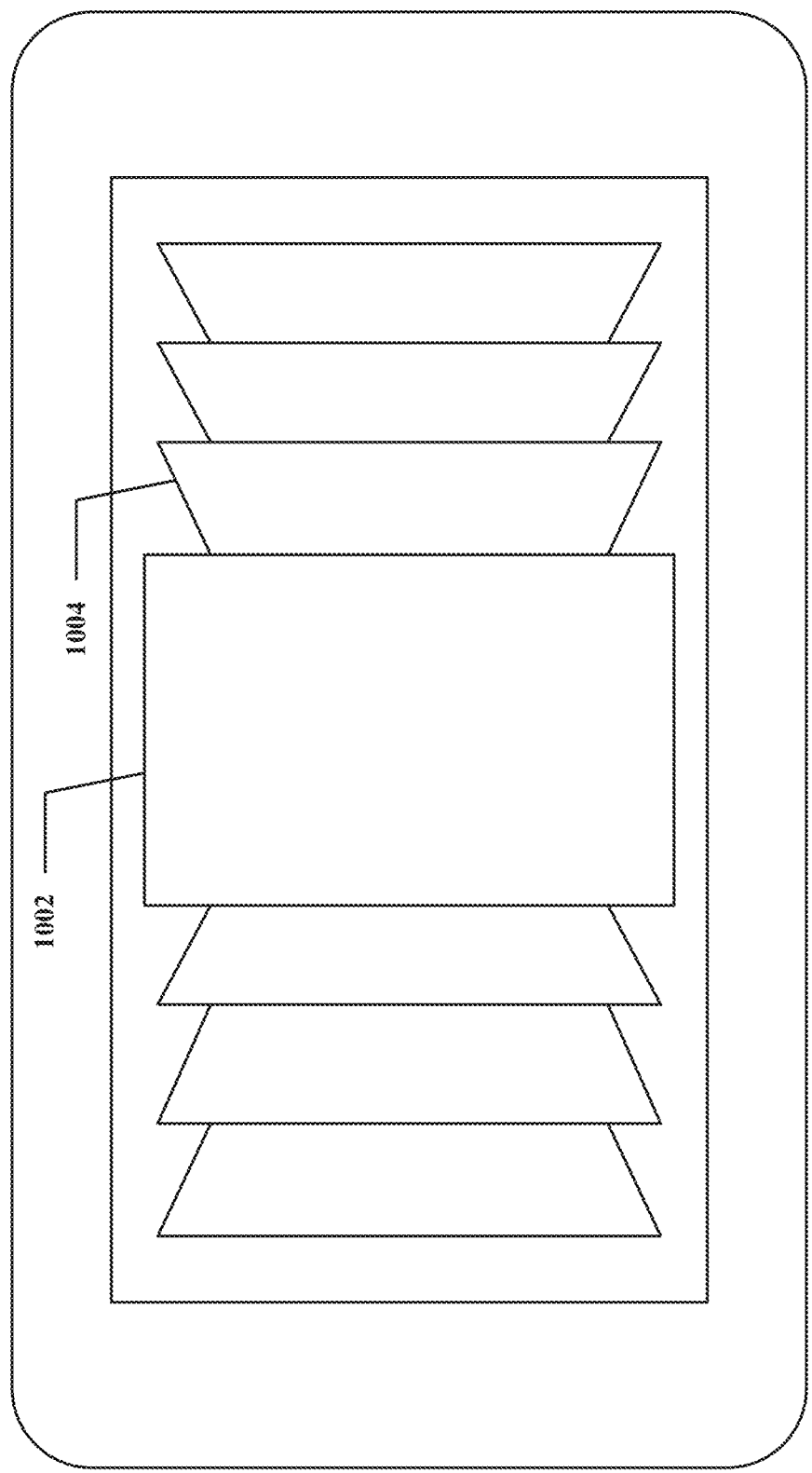
FIG. 10 is an example user interface illustrating a display for browsing through item listings.

FIG. 10 is an example user interface illustrating a display for browsing through item listings. The user interface shown in FIG. 10 may display images of items in a large display format to allow a user to view each item in greater resolution and detail. The user interface of FIG. 10 may leverage touch screen functionality by displaying the items as a set of pages capable of being flipped using a touch screen gesture. For example, a user may swipe a finger across the screen of the client device to flip from one item image 1002 to another 1004. The user may use a different touch screen gesture to select the item to learn additional information, such as the title of the image, a description of the item, and a price of the item. The user interface further may include one or more selectable display elements that enable a user to save the item, such as by adding the item to a dressing room or closet feature of the application. Navigation and selection of the item may be accomplished by non-touch screen gesture methods, such as by using an input device or pointer to select the item or to navigate from one item to another.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It may be appreciated that the decision to implement a hardware module mechanically, in dedicated and permanently configured circuitry, or in temporarily configured circuitry (e.g., configured by software) may be driven by cost and time considerations.

Accordingly, the term "hardware module" may be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product (e.g., a computer program tangibly embodied in an information carrier or a machine-readable medium) configured for execution by, or to control the operation of, data processing apparatus (e.g., a programmable processor, a computer, or multiple computers).

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a field programmable gate array (FPGA) or an application-specific integrated circuit (ASIC)).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it may be appreciated that that both hardware and software architectures require consideration. Specifically, it may be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 11:
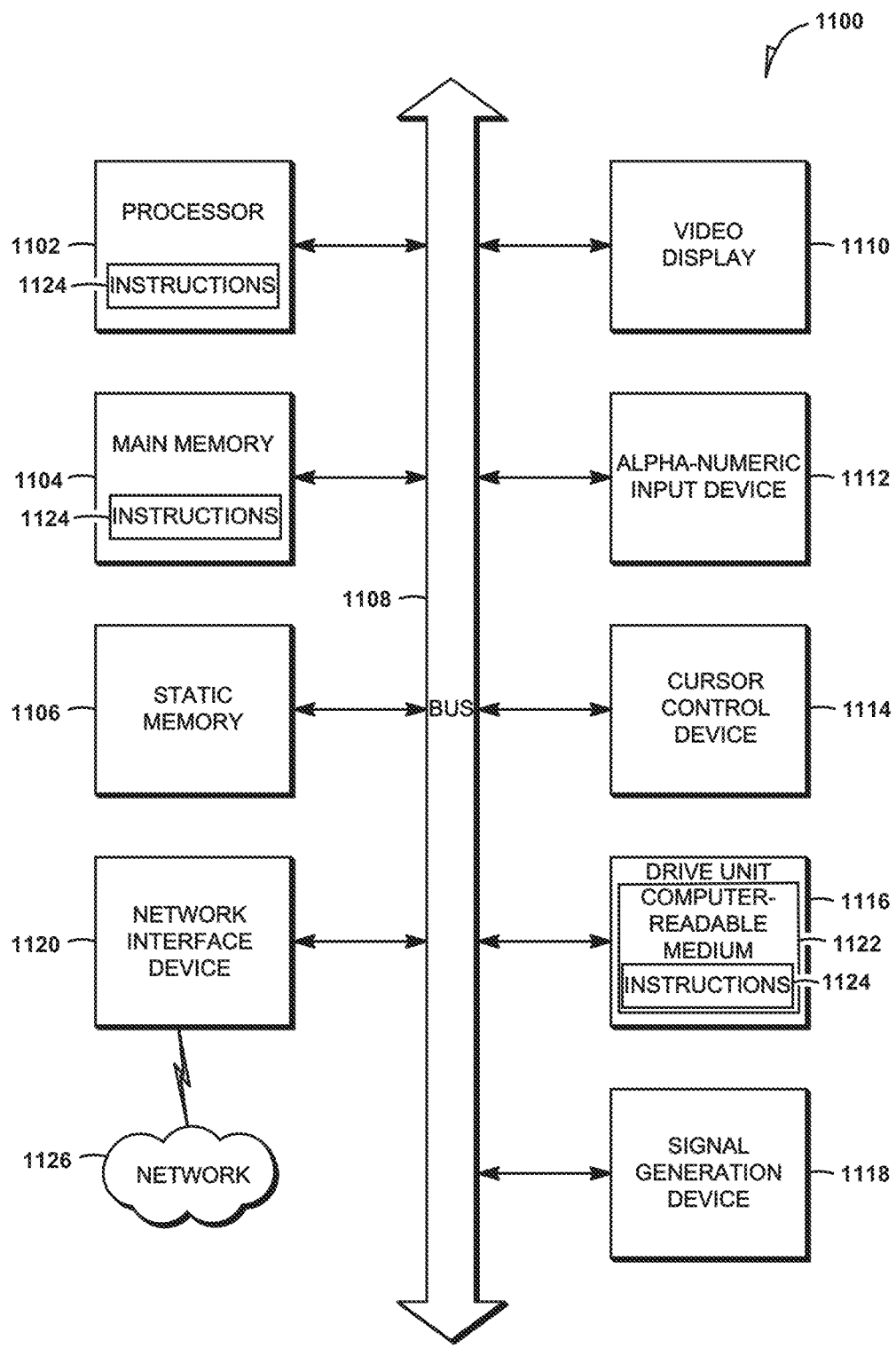
FIG. 11 is a simplified block diagram of a machine in an example form of a computing system within which a set of instructions for causing the machine to perform any one or more of the methodologies discussed herein may be executed.

FIG. 11 is a block diagram of machine in the example form of a computer system 1100 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU), a graphics processing unit (GPU) or both), a main memory 1104 and a static memory 1106, which communicate with each other via a bus 1108. The computer system 1100 may further include a video display unit 1110 (e.g., a liquid crystal display (LCD) or a cathode ray tube (CRT)). The computer system 1100 also includes an alphanumeric input device 1112 (e.g., a keyboard), a user interface (UI) navigation device 1114 (e.g., a mouse), a disk drive unit 1116, a signal generation device 1118 (e.g., a speaker) and a network interface device 1120.

Machine-Readable Medium

The disk drive unit 1116 includes a machine-readable medium 1122 on which is stored one or more sets of instructions and data structures (e.g., software) 1124 embodying or utilized by any one or more of the methodologies or functions described herein. The instructions 1124 may also reside, completely or at least partially, within the main memory 1104 and/or within the processor 1102 during execution thereof by the computer system 1100, the main memory 1104 and the processor 1102 also constituting machine-readable media.

While the machine-readable medium 1122 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1124 may further be transmitted or received over a communications network 1126 using a transmission medium. The instructions 1124 may be transmitted using the network interface device 1120 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it may be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it may be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, may be apparent to those of skill in the art upon reviewing the above description.

What is claimed is:

1. A method implemented by a client device, the method comprising:
    capturing, by an image capture device of the client device, a first image of an item;
    generating, by the client device, a search request including the first image of the item;
    receiving, by the client device, a search result including a second image of the item, the search result received from an image search performed using the search request;
    capturing, by the image capture device of the client device, a live camera feed of a reflection on a reflective surface, the image capture device being separate from the reflective surface;
    generating, by the client device, a superimposed image by overlaying the item from the second image over a video stream of the live camera feed; and
    causing, by the client device, the superimposed image to be displayed on a display of the client device, the superimposed image presenting the item from the second image with at least a portion of the reflection in the video stream.

2. The method as described in claim 1, wherein the superimposed image is user selectable to generate a request for additional information about the item from the second image.

3. The method as described in claim 2, further comprising:
    generating the request for additional information about the item from the second image in response to receiving an indication of a selection of the superimposed image;
    transmitting the request generated to a system; and
    receiving a product listing page from the system corresponding to the item from the second image.

4. The method as described in claim 1, further comprising removing a background from the second image such that the item is in the second image.

5. The method as described in claim 4, wherein the removing includes:
    identifying edges of the item using image processing edge detection;
    distinguishing the background from the item based on the identified edges of the item; and
    making the background of the second image transparent.

6. The method as described in claim 1, further comprising:
    transmitting the search request to a system via a network; and
    receiving the search result via the network from the system responsive to the search request.

7. The method as described in claim 6, wherein the second image includes the item and has no background.

8. A device comprising:
    an image capture device;
    a display;
    at least one processor; and
    memory having instructions stored on the memory that, responsive to execution by the at least one processor, causes the at least one processor to perform operations comprising:
        capturing, by the image capture device, a first image of an item;
        generating a search request including the first image of the item;
        receiving a search result including a second image, the search result received from an image search performed using the search request;
        capturing, by the image capture device, a live camera feed of a reflection on a reflective surface, the image capture device being separate from the reflective surface;
        generating a superimposed image by overlaying an item from the second image over a video stream of the live camera feed; and
        causing the superimposed image to be displayed on the display, the superimposed image including the item from the second image with at least a portion of the reflection in the video stream.

9. The device as described in claim 8, wherein the superimposed image is user selectable to generate a request for additional information about the item from the second image.

10. The device as described in claim 9, wherein the instructions further cause operations to be performed including:
generating the request for additional information about the item from the second image in response to receiving an indication of a selection of the superimposed image;
transmitting the generated request to a system; and
receiving a product listing page from the system corresponding to the item from the second image.

11. The device as described in claim 8, wherein the instructions further cause operations to be performed including removing a background from the second image such that the item is in the second image.

12. The device as described in claim 11, wherein the removing includes:
identifying edges of the item using image processing edge detection;
distinguishing the background from the item based on the identified edges of the item; and
making the background of the second image transparent.

13. The device as described in claim 11, wherein the capturing of the video feed is performed by pointing the image capture device at the reflective surface.

14. The device as described in claim 8, further comprising:
transmitting the search request to a system via a network; and
receiving the search result via the network from the system responsive to the search request, the search result including the second image.

15. The device as described in claim 14, wherein the second image includes the item and has no background.

16. A non-transitory computer-readable storage medium storing instructions executable by a computing device which, when executed by a processor of the computing device, causes the computing device to:
generate a search request including a first image of an item;
receive a search result including a second image of the item, the search result received from an image search performed using the search request;
capture via an image capture device directed at a separate reflective surface, a live camera feed of a reflection on the reflective surface;
generate a superimposed image by overlaying the item from the second image over a video stream of the live camera feed; and
cause the superimposed image to be displayed on a display of a client device, the superimposed image including the item from the second image with at least a portion of the captured reflection in the video stream.

17. The non-transitory computer-readable storage medium as described in claim 16, further comprising:
transmitting the search request to a system via a network; and
receiving the search result via the network from the system responsive to the search request, the search result including the second image.

18. The non-transitory computer-readable storage medium as described in claim 16, wherein the superimposed image is user selectable to generate a request for additional information about the item from the second image.

19. The non-transitory computer-readable storage medium as described in claim 18, further comprising:
generating the request for additional information about the item from the second image in response to receiving an indication of a selection of the superimposed image;
transmitting the request generated to a system; and
receiving a product listing page from the system corresponding to the item from the second image.

20. The non-transitory computer-readable storage medium as described in claim 16, wherein the second image includes the item and includes no background.

* * * * *